May 30, 1972  E. P. BLOCK  3,666,618
LAMINATE BONDED WITH AN ADHESIVE WAXY TELOMER
OF ETHYLENE ON PSEUDOCUMENE
Original Filed April 12, 1968
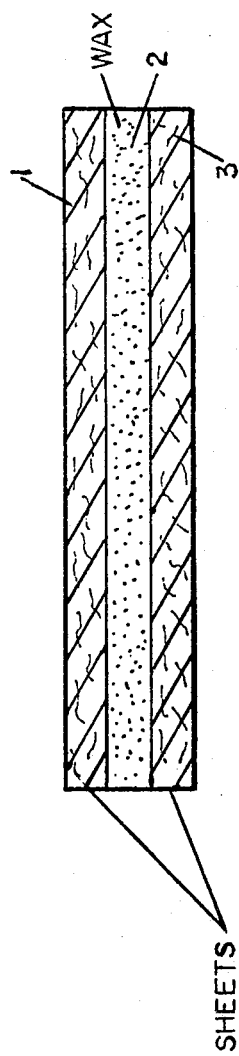

United States Patent Office 3,666,618
Patented May 30, 1972

3,666,618
LAMINATE BONDED WITH AN ADHESIVE WAXY TELOMER OF ETHYLENE ON PSEUDOCUMENE
Ernest P. Block, West Chester, Pa., assignor to Sun Oil Company, Philadelphia, Pa.
Original application Apr. 12, 1968, Ser. No. 720,832. Divided and this application Oct. 7, 1970, Ser. No. 78,942
Int. Cl. B32b *27/10, 27/32;* C09j *3/14*
U.S. Cl. 161—235    4 Claims

ABSTRACT OF THE DISCLOSURE

Laminating wax of high adhesive characteristics especially useful in the production of intercalated products is obtained from telomer resulting from a telomerization employing pseudocumene as the telegen and ethylene as the taxogen, the reaction producing said telomer being hereinafter referred to as the telomerization of ethylene on pseudocumene.

CROSS REFERENCE TO RELATED APPLICATION

This is a division of application Ser. No. 720,832, filed Apr. 12, 1968.

BACKGROUND OF THE INVENTION

The preparation of intercalated products from materials in the form of relatively thin layers, films, or sheets called laminations is widely practiced with a considerable variety of materials, such as those of cellulosic composition, of which cellophane, pasteboard, cardboard, paper and cotton cloth in their various forms are outstanding examples. A wide variety of sheet materials of synthetic composition also are used, a typical example being polyethylene. Strong adhesiveness is assiduously sought in the wax employed.

The telomerization of benzenoid hydrocarbons, including pseudocumene, with ethylene is taught in U.S. Pat. No. 3,206,519. As between the telogen pseudocumene (1,2,4-trimethylbenzene) and closely related telogens, such as, mesitylene (1,3,5-trimethylbenzene), and xylene (a mixture of dimethylbenzenes), surprisingly wide differences in the adhesive properties of comparable wax fractions of the resulting telomers have been discovered. To illustrate, and upon employing the standardized test described in lines 25–54, column 2 of U.S. Pat. 2,746,910, relevant fractions obtained from telomers of ethylene on pseudocumene had adhesion values within the range of 70–160 grams, whereas relevant fractions of telomers of ethylene on mesitylene had adhesion values within the range of 3–4, and relevant fractions of telomers of ethylene on mixed xylenes had adhesion values of 7–19. A relevant fraction of a telomer of ethylene on para-xylene had an adhesion value of 11. A telomer of ethylene on benzene yielded a relevant fraction having an adhesion value of only 2.

SUMMARY OF THE INVENTION

The invention resides in a laminating wax which is a telomer of ethylene on pseudocumene, and which has cooling curve melting point in the range of 135–155° F. as determined by test method A.S.T.M. D–87, or its equivalent; a penetration, as determined by A.S.T.M. test method D–1321, in the range of 18–30 at 77° F., in the range of 28–40 at 90° F., and in the range of 32–56 at 100° F.; a viscosity at 210° F., as determined by A.S.T.M. test method D–2161, in the range of 70–76 SUS; an average molecular weight, as determined by the vapor pressure osmometer method, A.S.T.M. D–2503, in the range of 550–750; and in an adhesion value, as determined by the standardized test method described in U.S. Pat. 2,746,910, of at least 70 grams.

Preferably, melting points fall between 145–155° F.; pentrations between 20–26 at 77° F., between 33–40 at 90° F., and between 35–50 at 100° F.; viscosities at 210° F. between 70–74 SUS; average molecular weights between 600–700; and adhesion values of at least 75; all determined by the test methods set forth in the previous paragraph.

The invention also resides in a particularized method for producing the basic telomer product in combination with steps for separating the above new laminating wax from said basic telomer product, which steps involve solvent fractionation, particularly after removal of light ends by distillation.

In addition the invention resides in the new laminated product resulting from the use of the new laminating wax of the invention.

BRIEF DESCRIPTION OF THE DRAWING

In the drawing, the single figure represents an intercalated product of the invention, and wherein 1 and 3 represent laminations, such as of paper or otherwise, between which is intercaltaed a layer 2 of laminating wax of the invention.

DESCRIPTION OF THE INVENTION

Although the telomer of ethylene on pseudocumene from which the laminating wax of the invention is separated can be prepared otherwise, it is preferred that it be prepared under particularized conditions falling within the teachings in Eberhardt U.S. Pat. No. 3,206,519, and to be hereinafter more particularly pointed out.

In a typical preparation of the crude telomer, pseudocumene and ethylene are brought into contact in the presence of a catalyst which is a combination of a nonaromatic tertiary amine, which is a chelating diamine or a bridgehead amine, with LiR, wherein R is a hydrocarbon radical which preferably is alkyl having 2-10 carbon atoms; said contact taking place (1) with the pseudocumene (including its reaction products) present in the reaction zone in at least 50 percent, preferably at least 75 percent, concentration by volume, and (2) under temperature conditions in the range 50–130° C., preferably 80–110° C., and (3) with ethylene pressure in the reaction zone in the range of 200–400 p.s.i.g., preferably 250–350 p.s.i.g.

Also typically, the amine is present in the catalyst combination in at least equimolar amount relative to the LiR component and preferably a substantial molar excess of the amine is used.

Examples of chelating diamines are N,N,N',N'-tetramethylethylene diamine, N,N,N',N'-tetrapropylethylene diamine, N,N,N',N' - tetraalkyl-1,2-diaminocyclohexane, N,N'-dialkylbispidin and sparteine.

Examples of amines in which one or more of the nitrogen atoms are at a bridgehead position, that is with all three valences of the nitrogen participating in the ring system, are triethylene diamine, quinuclidine, and the azo-adamantanes which structurally resemble adamantane, except that one or more nitrogen atoms are substituted at bridgehead positions in place of carbon.

In carrying out the reaction, it is well to keep in mind the following theoretical considerations as guidelines.

The first step in initiating the reaction involves the transfer of a lithium atom from the catalyst complex to a pseudo-cumene molecule, and replacement of a hydrogen atom thereon by the Li, the hydrogen atom replaced being by reaction preference a primary hydrogen atom on one of the methyl side chains. The next step is the propagation of a chain by the addition of ethylene molecules between the Li atom and the adjacent carbon atom, the Li atom continuing to be located at the end of the chain. Finally, this telomerization reaction will terminate due to transmetallation whereby the Li atom at the end of the chain transfers with a new hydrogen atom in the same manner as initially occurred. The newly formed reaction site then undergoes chain growth in a new reaction cycle, and the mechanism is repeated.

A multiplicity of such reactions taking place simultaneously on the same and on different pseudocumene molecules can be visualized. It can also be visualized that reaction can take place at an unsubstituted ring carbon atom of the pseudocumene molecule and chain growth therefrom takes place. And, since the conditions of reaction favor transmetallation over propagation, substantial transference of Li atoms with additional hydrogen atoms on the alpha carbon atoms of the side chains is visualized as well as a contributing factor to the outstanding characteristics of the lamination wax produced.

The length of chain growth depends upon the rate of the propagation reaction relative to the rate of the transmetallation reaction, since the latter functions to terminate the former.

The rate of propagation depends largely on the ethylene pressure employed, increasing with ethylene pressure, while the transmetallation reaction is largely unaffected, if at all, by ethylene pressure.

On the other hand, the rate of transmetallation increases with increasing concentration of pseudocumene (including its reaction products) in the reaction zone.

In the production of crude telomer to which this invention relates, the rate of the propagation reaction relative to the rate of the transmetallation reaction is so controlled, e.g., within the reaction conditions set forth in detail above, to yield a laminating wax fraction of the specifications herein described and claimed.

Thus to produce a telomer having a laminating wax fraction with (1) cooling curve melting point, (2) penetration, (3) viscosity, and (4) average molecular weight, specifications of a character as set forth above, and with (5) adhesion values as set forth, the rate of propagation relating to the rate of transmetallation is held in check, thus limiting the length of average individual chain growth, by placing a maximum on ethylene pressure, while at the same time assuring a sufficiently high average individual chain length by placing a minimum on said pressure, with the rate of transmetallation coordinatedly relatively high by virtue of high concentration of pseudocumene (including its reaction products) in the reaction zone, so that due to interaction of said reaction rates, a type of substituted pseudocumene wax molecule is built up having the high adhesion values herein set forth.

While temperature conditions during the reaction are not as critical as the above factors, for all around good results, those set forth ought to be observed.

It will be understood that there is a variation in the chain length, and most probably also a variation in the number of propagated chains, on individual molecules of the telomer including its wax fraction, so that both the parent telomer and its fractions comprise a mixture of alkylbenzenes having, insofar as the wax fraction is concerned, a range in cooling curve melting points, penetrations, viscosities, and molecular weights, a consideration which from the standpoint of identification is met as to the overall laminating wax by the recitation of test methods herein, whereby the laminating wax of the invention can be fully and completely identified.

Pseudocumene being a liquid, the reaction can be carried out in the absence or in the presence of a solvent of which hexane, cyclohexane, octane, decane and the like are examples, attention being given to concentration considerations herein set forth.

Separation of the laminating wax from the telomer obtained, such as described above, can be carried out in any desired manner. A typical procedure of the invention involves, as an initial step, distillation at reduced pressure to remove the most volatile portion of the reaction product, unreacted reactants, and any solvent present. This is followed by dissolving, at elevated temperature, the waxy residuum in a solvent, for example, n-hexane. The resulting solution is cooled slowly to precipitate a hard polish-type wax which is removed by filtration. The filtrate obtained is now further cooled slowly to precipitate the laminating wax fraction which, after recovery by filtration, is subjected to treatment for solvent removal, e.g., by use of elevated temperature, reduced pressure, and/or nitrogen stripping. The final filtrate contains a petrolatum-like material which, if desired, can be recycled to the telomerization reaction zone.

Other solvents may be employed in place of n-hexane for separating from the telomer the desired laminating wax fraction. To illustrate, a laminating wax fraction of exceptionally high adhesiveness was obtained from pseudocumene-ethylene telomers using a mixture of 40% benzene-60% methyl ethyl ketone as solvent.

The laminating wax, being a mixture of alkylbenzenes of different melting points, penetrations, viscosities and molecular weights, has properties which are a composite function of the properties of the individual alkylbenzenes present, and their relative concentrations.

Generally speaking, for any given solvent, solubilities of the alkylbenzenes increase with decrease in melting point, penetration, viscosity and molecular weight, and vice versa. Also solubilities increase with increase in temperature, and vice versa, the amount held in solution being a function of solvent concentration, increasing with increase in solvent concentration, and vice versa.

These and other considerations are so well known and understood in the art of solvent fractionation as not to require further elaboration, and it is by following well-established principles in the practice of this art that wax fractions having properties falling within the broad and/or specific ranges set forth above are obtained from the crude telomer. Accordingly it is to be understood that the following examples are given by way of illustration.

Example I

A stainless steel reactor with agitator and of 1 liter capacity was employed. This was charged with 200 ml. of pseudocumene, 20 ml. of a 1.65 molar solution of butyl lithium in cyclohexane, and 5 ml. of N,N,N',N'-tetramethylethylene diamine, and then warmed to 60° C. The reactor was pressured to 300 p.s.i.g. with ethylene, and the temperature allowed to come up to 95–100° C., with agitation of the reaction mixture and some application of heat. The reaction was permitted to proceed for approximately 4 hours, whereupon the ethylene source was disconnected, and the catalyst killed, as by the addition of water, after permitting the reactor to cool, and the venting of residual gas. The reaction mixture was washed with water to remove catalyst residues. Upon removal of solvent and any unreacted pseudocumene by distillation 373 grams of alkylbenzene product were obtained.

From the foregoing product, 273 grams of relatively volatile oil were distilled off, leaving 100 grams for solvent fractionation. Of the latter, 92.5 grams were dissolved in 920 ml. of n-hexane heated to near its boiling point for solution purposes. After solution was complete, the mixture was slowly cooled to 80° F., and the precipitate, a hard polish-type wax, was separated by filtration, with the precipitate being washed with n-hexane to recover adhering laminating wax.

The combined filtrate and washings were now slowly cooled to 36° F., and the precipitate recovered by filtration and n-hexane washing. The latter precipitate, comprising the laminating wax of the invention, was subjected at elevated temperature to nitrogen stripping to remove residual solvent.

This laminating wax had a melting point of 150; penetrations by A.S.T.M. D–1321 at 77° F. of 24, at 90° F. of 34, and at 100° F. of 40; a viscosity at 210° F. A.S.T.M. D–445 of 13.8 cs., and by A.S.T.M. D–2161 of 73 SUS, an average molecular weight ($M_n$) of 650, and an adhesion (grams/2" strip of 84. The yield was 22.7 grams.

The oil initially distilled from the reaction mass, and the petrolatum-like wax recovered from the final filtrate, find utility, among other things, by way of recycle back to the zone of telomerization, for further reaction into higher molecular weight material.

Example II

A stainless steel reactor with agitator and of 1 liter capacity was employed. This was charged with 200 ml. of pseudocumene, 20 ml. of a 1.65 molar solution of butyl lithium in cyclohexane, and 5 ml. of N,N,N',N'-tetramethylethylene diamine, and then warmed to 60° C. The reactor was pressured to 300 p.s.i.g. with ethylene, and the temperature allowed to come up to 95–100° C., with agitation of the reaction mixture and some application of heat. The reaction was permitted to proceed for approximately 4 hours, whereupon the ethylene source was disconnected, and the catalyst killed, as by the addition of water, after permitting the reactor to cool, and the venting of residual gas. The reaction mixture was washed with water to remove catalyst residues. Upon removal of solvent and unreacted pseudocumene by distillation 317 grams of alkylbenzene product were obtained.

From the foregoing product, 229 grams of relatively volatile oil were distilled off, leaving 88.7 grams for solvent fractionation. Of the latter, 78.9 grams were dissolved in 800 ml. of n-hexane heated to near its boiling point for solution purposes. After solution was complete, the mixture was slowly cooled to 80° F., and the precipitate, a hard polish-type wax, was separated by filtration, with the precipitate being washed with n-hexane to recover adhering laminating wax.

The combined filtrate and washings were now slowly cooled to 36° F., and the precipitate recovered by filtration and n-hexane washing. The latter precipitate, comprising the laminating wax of the invention, was subjected at elevated temperature to nitrogen stripping to remove residual solvent.

This laminating wax had a melting point of 149; penetrations by A.S.T.M. D–1321 at 77° F. of 25, at 90° F. of 38, and at 100° F. of 47; a viscosity at 210° F. by A.S.T.M. D–445 of 13.8 cs., and by A.S.T.M. D–2161 of 73 SUS, an average molecular weight ($M_n$) of 650, and an adhesion (grams/2" strip) of 76. The yield was 16.1 grams.

Example III

A stainless steel reactor with agitator and of 1 liter capacity was employed. This was charged with 400 ml. of pseudocumene, 40 ml. of a 1.65 molar solution of butyl lithium in cyclohexane, and 10 ml. of N,N,N',N'-tetramethylethylene diamine, and then warmed to 60° C. The reactor was pressured to 300 p.s.i.g. with ethylene, and the temperature allowed to come up to 95–100° C., with agitation of the reaction mixture and some application of heat. The reacton was permitted to proceed for approximately 4 hours, whereupon the ethylene source was disconnected, and the catalyst killed, as by the addition of water, after permitting the ractor to cool, and the venting of residual gas. The reaction mixture was washed with water to remove catalyst residues. Upon removal of solvent and unreacted pseudocumene by distillation 733 grams of alkylbenzene product were obtained.

From the foregoing product, 548 grams of relatively volatile oil were distilled off, leaving 185 grams for solvent fractionation. Of the latter, 172 grams were dissolved in 1000 ml. of 40% benzene-60% methyl ethyl ketone solvent heated to near its boiling point for solution purposes. After solution was complete, the mixture was slowly cooled to 113° F., and the precipitate, a hard polish-type wax, was separated by filtration, with the precipitate being washed with the above solvent mixture to recover adhering laminating wax.

The combined filtrate and washings were now slowly cooled to 55° F., and the precipitate recovered by filtration and washing with the above solvent mixture. The latter precipitate, comprising the laminating wax of the invention, was subjected at elevated temperature to nitrogen stripping to remove residual solvent.

This laminating wax had a melting point of 149; penetrations by A.S.T.M. D–1321 at 77° F. of 21, and at 100° F. of 39; a viscosity at 210° F. by A.S.T.M. D–445 of 13.4 cs., (71.7 SUS), an average molecular weight ($M_n$) of 646, and an adhesion (grams/2" strip) of 150. The yield was 22.7 grams.

Substitution in the above examples of variables within the teachings of this specification yields comparable results.

On the other hand, a significant departure therefrom yields significantly poorer results.

The case of mesitylene, which represents a mere shift in position of one of the three methyl groups on the benzene ring as compared to pseudocumene, has already been pointed out. In a run which was a virtual duplicate of Example I, but with mesitylene as telogen instead of pseudocumene, the adhesion value of the relevant wax fraction was 4. A rerun of Example III under virtually the same conditions, but with the ethylene pressure increased to 600 p.s.i.g., dropped the adhesion value to 10, and a rerun of Example I under virtually the same conditions, except that closed to twice the volume of n-hexane based on telogen was added to the reaction zone, dropped the adhesion value to 62.

The outstanding contribution to the art made by the invention is thus abundantly demonstrated.

In this specification and in the claims, values given for (1) cooling curve melting point, (2) penetration, (3) viscosity, (4) molecular weight, and (5) adhesion are as determined by test methods as follows:

(1) Cooling curve melting point—A.S.T.M. D–87 or equivalent method
(2) Penetration—A.S.T.M. D–1321
(3) Viscosity—A.S.T.M. D–2161
(4) Molecular weight—Vapor phase osmometer method A.S.T.M. D–2503
(5) Adhesion—Procedure set forth in lines 25–54, column 2 of U.S. Pat. 2,746,910

I claim:
1. A laminated material comprising at least two laminae adhered together by a film of laminating wax, said laminating wax comprising a telomer of ethylene on pseudocumene, said wax having a cooling curve melting point in the range of 135–155° F.; a penetration at 77° F. in the range of 18–30, at 90° F. in the range of 28–40, and at 100° F. in the range of 32–56; a viscosity at 210° F. in the range of 70–76 SUS; an average molecular weight in the range of 550–750; and an adhesion value of at least 70 grams.

2. The laminated material of claim 1 in which the laminae are of cellulosic composition.

3. A laminated material comprising at least two laminae adhered together by a film of laminating wax, said laminating wax comprising a telomer of ethylene on pseudocumene, said wax having a cooling curve melting point in the range of 145–155° F.; a penetration at 77° F. in the range of 20–26, at 90° F. in the range of 33–40, and at 100° F. in the range of 35–50; a viscosity at 210° F. in the range of 70–74; an average molecular weight in the range of 600–700; and an adhesion value of at least 75 grams.

4. The laminated material of claim 3 in which the laminae are of cellulosic composition.

References Cited

UNITED STATES PATENTS

| | | | |
|---|---|---|---|
| 2,691,647 | 10/1954 | Field et al. | 260—79.3 R |
| 2,728,802 | 12/1955 | Closson et al. | 260—668 B |
| 3,025,167 | 3/1962 | Butler | 99—171 |
| 3,115,468 | 12/1963 | Emrick et al. | 252—59 |
| 3,206,519 | 9/1965 | Eberhardt | 260—268 R |
| 3,458,586 | 7/1969 | Langer | 260—668 B |

JOHN T. GOOLKASIAN, Primary Examiner

R. A. DAWSON, Assistant Examiner

U.S. Cl. X.R.

156—334; 161—234, 249, 250

UNITED STATES PATENT OFFICE
CERTIFICATE OF CORRECTION

Patent No. 3,666,618        Dated May 30, 1972

Inventor(s) Ernest P. Black

It is certified that error appears in the above-identified patent and that said Letters Patent are hereby corrected as shown below:

It is requested that the name Ernest P. BLOCK be changed to Ernest P. BLACK.

Signed and sealed this 17th day of October 1972.

(SEAL)
Attest:

EDWARD M. FLETCHER, JR.
Attesting Officer

ROBERT GOTTSCHALK
Commissioner of Patents